Aug. 23, 1932.  F. C. STOLLE  1,872,841

MATERIAL SPREADER

Filed June 7, 1930

INVENTOR
Frank C. Stolle
BY Rodney Bedell
ATTORNEY

Patented Aug. 23, 1932

1,872,841

UNITED STATES PATENT OFFICE

FRANK C. STOLLE, OF ST. LOUIS, MISSOURI

MATERIAL SPREADER

Application filed June 7, 1930. Serial No. 459,757.

My invention relates to the art of spreading sand, dirt, gravel and other material along the ground and consists in a hopper device arranged for ready application to or removal from a truck body.

The main object of my invention is to provide a simple, economical and efficient device which can be applied to the tail end of a truck, such as is in general use, without any modification of the truck structure and which will enable the workman to distribute the truck load evenly over a wide area.

An additional object is to make it possible to readily adjust the feed of the device to accommodate material of different sizes of elements and of different degrees of coherence.

Another object of my invention is to provide in the device itself means for agitating the material therein to facilitate its discharge from the device.

A further object of my invention is to enable the truck driver to operate the feed adjustment and the agitating mechanism.

These and other detailed objects of my invention are attained by the structure illustrated in the accompanying drawing in which—

Figure 1:
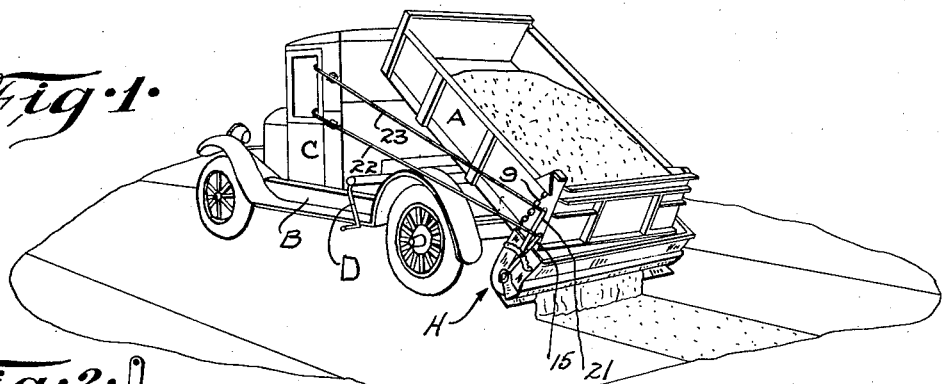
Figure 1 is a perspective of a truck of the tilting body type having my improved device attached to its rear end.
Figure 2:
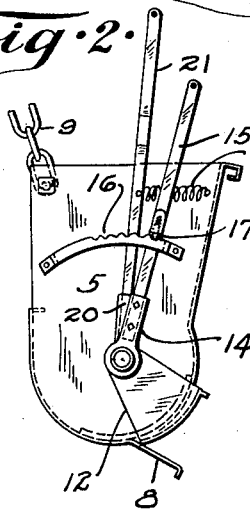
Figure 2 is an end elevation of my device.
Figure 3:
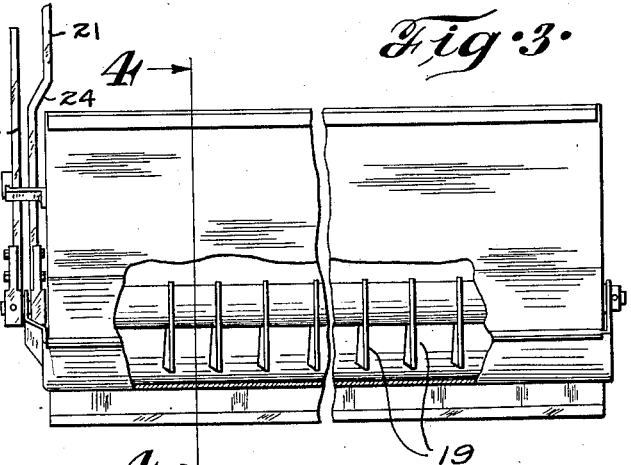
Figure 3 is a side elevation of the same, the rear wall being cut away in part to show the interior structure.
Figure 4:
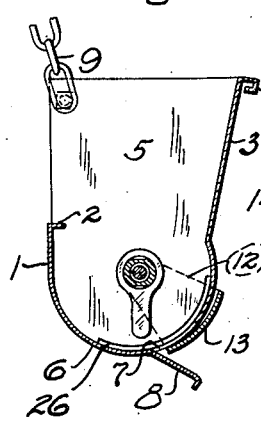
Figure 4 is a vertical section taken on the line 4—4 of Figure 3.
Figure 5:
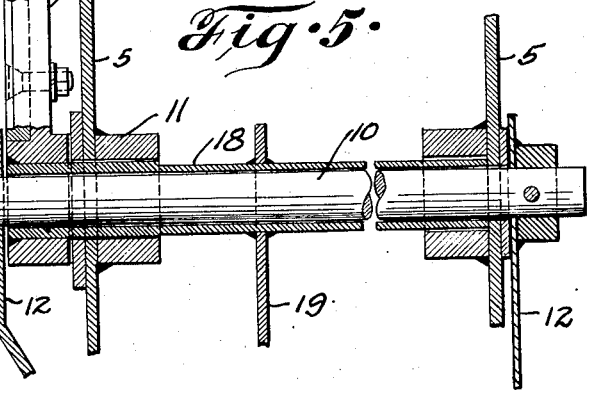
Figure 5 is an enlarged detail longitudinal section through the operating mechanism.

The truck illustrated in Figure 1 is of any ordinary structure, having a tilting body A mounted on the truck chassis B, and the truck has the usual driver's cab C and means for tilting the body to the position shown or returning it to normal position which is indicated generally by the crank D. My present invention embodies a hopper device H for application to such a truck and the hopper structure comprises a relatively short front wall 1 having an inturned flange 2 along its top edge adapted to engage the bottom of the truck body near the rear end of the latter. The hopper also comprises a relatively high rear wall 3 provided with a suitable reinforcing flange 4. Walls 1 and 3 are connected at their ends by end walls 5 of substantially the same height as wall 3. All of these upright walls are connected by the curved bottom wall 6 provided with an opening 7 through which material may fall onto the ground. A portion 8 of the plate forming the bottom 6 is cut away along three sides and bent down to the position shown in Figure 4 to form a flange which is disposed substantially vertically when the truck body A is tilted to the position shown in Figure 1.

A chain 9 or like element is secured to each side wall 5 and is adapted to be attached to the truck body by any suitable means or may merely extend across the body and down to the opposite end wall of the hopper device.

A shaft 10 extends through the hopper from end to end, being journalled in suitable bearings 11 attached to the hopper end walls 5. Segment-like arms 12 are secured to shaft 10 outside of the hopper ends 5 and a curved plate 13 extends from arm to arm and is adapted to be swung with the latter from the position shown in Figure 4 upwardly to uncover as much of the opening 7 as is desired.

A crank 14 is provided on the end of shaft 10 and an extension 15 enables the operator to easily move the adjusting plate 13. A serrated bar 16 and a spring pressed dog 17 on the handle 15 cooperate to yieldingly hold arms 12 and plate 13 in desired position.

A pipe or similar sleeve 18 is mounted on shaft 10 and is provided with a plurality of downwardly disposed blades 19 each twisted slightly so as to be disposed diagonally to a plane traversing the shaft and sleeve at right angles to their axis. A crank 20 on the end of sleeve 18 is provided with a handle 21 whereby it may be oscillated by the operator to loosen the material in the hopper.

Preferably, each of the handles 15 and 21 have suitable connections 22 and 23, respectively, extending forwardly to the driver's cab whereby the driver may control the adjustment and the agitator. If desired, these connections might be located on the opposite side of the truck for an operator to handle while seated in the cab.

It will be understood that these connections are not essential to the operation of my device as, in many cases, it will be preferred for an operator to walk along the side of the truck and operate handles 15 and 21 as may be required.

With this in mind, handle 21 is offset as shown at 24 to provide plenty of room for the operator's hand around the upper end.

A spring 25 attached to the agitator handle 21 and to the body of the hopper returns the agitator blades to their normal position whenever the handle is operated.

I desire to provide means for readily adjusting the length of the opening 7 as well as adjusting the width of the opening. Such means are indicated at 26 in the form of arcuate plates or shutters which may be of any desired length and may be laid in the bottom of the hopper to extend over the space 7. By reference to Figure 1, it will be seen that the material is being discharged from the hopper in a stream which is narrower than the length of the hopper and this arrangement will be attained by placing one plate 26 at each end of the hopper. Obviously, if it was desired to form two spaced streams of material, this object could be attained by placing one or more plates in the intermediate portion of the hopper.

By means of this arrangement, it is possible to furnish the user with a hopper several feet longer than the width of the truck bed, and the full length of the hopper may be utilized particularly for spreading dry material which will flow out to the extreme ends of the hopper especially when the agitating device is operated. By use of the plates 26, however, the spread of material may be limited to the width of the truck body or even less. This feature is very desirable when the device is being used to spread gravel on a roadway covered with hot asphalt in which case the gravel may be spread wide enough to form a roadway for the truck wheels, it being understood that the truck will be backed along the roadway, the wheels riding over the gravel.

It is obvious that the exact structure described is not essential to the embodiment of my invention and I contemplate the exclusive use of such modifications in details as may be made in the commercial development of my invention and which come within the scope of my claims.

I claim:

1. A material distributing device for application to the rear end of a dump truck body having a tail gate, comprising a hopper formed with a front wall having an upper edge arranged to engage the bottom of the truck body, a rear wall arranged to cooperate with the truck tail gate to retain material, end walls connecting said front and rear walls, a bottom between said walls, said bottom having an opening for the passage of material, elements in said hopper for agitating the material therein, and means for manually operating said elements at intervals as desired from a point exteriorly of the hopper while the truck is moving.

2. A material distributing device for application to the rear end of a dump truck body having a tail gate, comprising a hopper formed with a front wall having an upper edge arranged to engage the bottom of the truck body, a rear wall arranged to cooperate with the truck tail gate to retain material, end walls connecting said front and rear walls, an arcuate bottom between said walls, said bottom having an opening for the passage of material, arcuate members slidable over said bottom member for adjusting said opening, elements for agitating the material in the hopper, and means for manually operating said members and elements at intervals as desired from a point exteriorly of the hopper while the truck is moving.

3. A load distributing device for application to the rear end of a truck body comprising a hopper arranged to receive material from the truck body and having a discharge opening in its bottom, a shaft extending longitudinally through said hopper, an arm depending from said shaft at the end of said hopper, a plate extending from said arm and over said opening, and means for rotating said shaft to move said plate from over said opening.

4. A load distributing device for application to the rear end of a truck body comprising a hopper arranged to receive material from the truck body and having a discharge opening in its bottom, a shaft extending longitudinally through said hopper, an arm depending from said shaft at the end of said hopper, a plate extending from said arm and over said opening, means for rotating said shaft to move said plate from over said opening, a sleeve rotatably mounted on said shaft and extending intermediate the ends of the hopper, agitating blades secured to said sleeve and extending therefrom towards the bottom of the hopper and over said opening, and means on said sleeve for oscillating the same and said blades to facilitate the movement of material through said opening.

5. A material distributing device for application to the rear end of a dump truck body having a tail gate comprising a hopper formed with a front wall having an upper edge arranged to engage the bottom of the truck body, a rear wall arranged to cooperate with the truck tail gate to retain material, end walls connecting said front and rear walls, a bottom between said walls, said bottom having an opening for passage of material, elements in said hopper for agitating the material therein, and means for operating said elements from the truck driver's seat.

6. A material distributing device for application to the rear end of a dump truck body having a tail gate, comprising a hopper formed with a front wall having an upper edge arranged to engage the bottom of the truck body, a rear wall arranged to cooperate with the truck tail gate to retain material, end walls connecting said front and rear walls, an arcuate bottom between said walls, said bottom having an opening for the passage of material, arcuate members slidable over said bottom member for adjusting said opening, elements for agitating the material in the hopper, and means for operating said members and elements from the truck driver's seat.

In testimony whereof I hereunto affix my signature this 5th day of June, 1930.

FRANK C. STOLLE.